(12) United States Patent
Incekara

(10) Patent No.: US 12,421,368 B2
(45) Date of Patent: Sep. 23, 2025

(54) POLYURETHANE FOAM COMPOSITION AND A METHOD FOR SYNTHESIS THEREOF

(71) Applicant: PIMSA OTOMOTIV ANONIM SIRKETI, Kocaeli (TR)

(72) Inventor: Emre Incekara, Kocaeli (TR)

(*) Notice: Subject to any disclaimer, the term of this patent is extended or adjusted under 35 U.S.C. 154(b) by 179 days.

(21) Appl. No.: 17/641,309

(22) PCT Filed: Nov. 2, 2021

(86) PCT No.: PCT/TR2021/051118
§ 371 (c)(1),
(2) Date: Mar. 8, 2022

(87) PCT Pub. No.: WO2022/146319
PCT Pub. Date: Jul. 7, 2022

(65) Prior Publication Data
US 2023/0151174 A1   May 18, 2023

(30) Foreign Application Priority Data
Dec. 29, 2020  (TR) ................................ 2020/22114

(51) Int. Cl.
| | | |
|---|---|---|
| *C08J 9/14* | (2006.01) | |
| *C08J 9/00* | (2006.01) | |
| *C08K 5/053* | (2006.01) | |
| *C08L 75/08* | (2006.01) | |

(52) U.S. Cl.
CPC ............. *C08J 9/141* (2013.01); *C08J 9/0061* (2013.01); *C08K 5/053* (2013.01); *C08L 75/08* (2013.01); *C08J 2201/022* (2013.01); *C08J 2203/14* (2013.01); *C08J 2205/05* (2013.01); *C08J 2375/08* (2013.01); *C08J 2483/04* (2013.01); *C08L 2203/14* (2013.01)

(58) Field of Classification Search
CPC . C08L 2203/14; C08L 75/08; C08J 2201/022; C08J 2205/05; C08J 9/141; C08J 9/0061; C08J 2203/14; C08J 2375/08; C08J 2483/04; C08J 2375/04; C08K 5/053; C08G 18/18; C08G 2110/0058; C08G 2110/0066; C08G 18/3206; C08G 18/4829; C08G 18/6677; C08G 18/7671
See application file for complete search history.

(56) References Cited

U.S. PATENT DOCUMENTS

| | | | |
|---|---|---|---|
| 2016/0145372 A1 | 5/2016 | Doroodian et al. | |
| 2020/0140684 A1* | 5/2020 | Adkins ................... | C08J 9/38 |

FOREIGN PATENT DOCUMENTS

| | | | | |
|---|---|---|---|---|
| CN | 110922558 A | * | 3/2020 | ......... C08G 18/3206 |
| EP | 824123 A1 | * | 2/1998 | ........... C08G 18/282 |
| EP | 1471086 B1 | | 8/2009 | |
| GB | 2237024 A | | 4/1991 | |
| KR | 20030005994 A | | 1/2003 | |
| TR | 201906740 A | * | 6/2019 | |

OTHER PUBLICATIONS

CN110922558A Machine Translation (Year: 2020).*
TR201906740A2 Machine Translation (Year: 2019).*
ISR and Written Opinion of the ISA for corresponding PCT/TR2021/051118, dated Dec. 24, 2021.

* cited by examiner

*Primary Examiner* — K. Boyle
(74) *Attorney, Agent, or Firm* — Egbert, McDaniel & Swartz, PLLC

(57) ABSTRACT

A method for synthesising polyurethane foam compositions convenient for use in areas wherein rigidity and lightness are required together in automotive sector and including the steps of: conduct of polyol dosage adjustment, adding inflating reaction catalyser onto polyol of convenient amount and mixing at mechanical mixture, adding glycerine while mixing is continued, adding surfactive while mixing is continued, adding gelling reaction catalyser while mixing is continued, adding cell opening agent while mixing is continued, adding cell opening agent while mixing is continued, adding at least an inflating agent selected from a group consisting of n-pentane, cyclo-pentane, $C_3H_8O_2$ gas and $C_2H_4O_2$ gas while mixing is continued, conduct of temperature adjustment of polyol base mixture, conduct of isocyanide dosage adjustment in a separate place, injecting polyol base mixture into reaction container from one side and isocyanides from other side, conduct of temperature control during reaction and opening mold and removing final product.

11 Claims, No Drawings

POLYURETHANE FOAM COMPOSITION AND A METHOD FOR SYNTHESIS THEREOF

THE TECHNICAL FIELD OF THE INVENTION

Invention relates to polyurethane foam compositions for use in automotive sector, providing lightness of vehicles and helping enhancement of power efficiency, and a method for synthesis thereof.

BACKGROUND OF THE INVENTION

Fossil fuel-oils use accounts for 80% of $CO_2$ release in the world. Use of polyurethane is a rational approach also for reducing $CO_2$ release which is main reason for global warming. Displaying high performance at low cost, polyurethane has a broad area of use ranging from white goods, automotive, construction, ship building medical and glues thanks to is high functionality.

Polyurethane is a polymer developed as a result of reactions of NCO group isocyanates with polyols of OH group. Involvement reaction is a totally polymerization reaction and is a sub-group of plastic family. Polyurethane foams are obtained by mixture of four raw materials, mainly polyol, isocyanides, floating gas, and a catalyst. In addition to isocyanides and polyol which are two fluids, polyurethane foam of close cell structure is obtained as a result of chemical reactions of activators. Foam composition speeds are controlled by a catalyst. Correct formulations of two raw materials and foam reaction control determine polyurethane density, mechanical strength, close cell structure, heat strength, acoustic protection etc.

Ecological problems arising due to increase experienced in global climate change have forced several countries and international organizations to take measures. One of those measures is to take under control inflating gases which is one of main components providing cell formation in polyurethane foam, high necessitates use of inflating gases not thinning ozone layer and having low global heating score. Use of current inflating gases available in market is restricted and banned by regulations, new generation inflating agents put into market as alternative of them have high costs. Hydrocarbons used at present and particularly use of hydrocarbons (HCFC) and hydrofluorocarbon (HFC) gases as inflating gases are expected to be banned by Kyoto Protocol soon. In addition, water ($H_2O$) can be used as a blowing agent for polyurethane materials, but water cannot provide a skin layer formation to provide high acoustic performance and water absorption strength expected in semi integral materials.

Therefore, compositions used in production of polyurethane and parameters applied therein are of nature determining areas where final product use is convenient. For instance, Patent document numbered EP1471086B1 in the related art relates to production of polyurethane foams with improved elasticity in particular and discloses a method for production of polyurethanes displaying high elasticity. Use of water as inflating agent is disclosed in the method. In addition, use of two different prepolymer is disclosed.

Another document in the related art, patent numbered TR2017/15478 aims to produce hydrolysed resistant polyurethane cast parts convenient for use in steering wheels, seats, arms and shoe soles in particular. The method developed for it discloses use of water as inflating agent and in addition to water use of hydrocarbons. The developed method states that particularly hydrolysis aging is prevented.

In addition to four main raw materials for production of said polyurethane, other compounds can also be added into composition to determine functional features of final product. When documents in the related art are examined and broad area of polyurethane use is considered, it is seen that studies conducted are inadequate. It is considered that method for production of polyurethane with enhanced functionality and particularly specialized for specific use areas in particular is needed.

BRIEF DESCRIPTION OF THE INVENTION

The present invention relates to a polyurethane foam composition and a method for synthesis thereof meeting the needs mentioned above, eliminating all disadvantages, and providing some additional advantages, and a manufacturing method for it.

Primary purpose of the invention is to obtain flexible semi-integral polyurethane foam composition with minimised ecological damages and convenient for use in areas wherein lightness and mechanical strength is required in automotive sector.

Another purpose of the invention is to obtain polyurethane foams enabling sound skin structure protection for long time together with rigidity when used in automotive sector, particularly semi-integral systems.

A further purpose of the invention is to achieve a polyurethane foam production method by use of a blowing agent with low cost, not containing halogen and convenient for global heating regulations.

In order to achieve above mentioned purposes, the invention is a method for synthesising polyurethane foam compositions convenient for use in areas wherein rigidity and lightness are required together in automotive sector and comprises process steps of conduct of polyol dosage adjustment,
adding a blowing catalyst onto polyol of convenient amount and mixing at mechanical mixture,
adding glycerine while mixing is continued,
adding surfactant while mixing is continued,
adding gelling catalyst while mixing is continued,
adding cell opening agent while mixing is continued,
adding mono-ethylene glycol while mixing is continued,
adding at least a blowing agent selected from a group consisting of n-pentane, cyclopentane, $C_3H_8O_2$ gas and $C_2H_4O_2$ gas while mixing is continued,
conduct of temperature adjustment of polyol base mixture,
conduct of isocyanate dosage adjustment in a separate place,
injecting polyol base mixture into reaction container from one side and isocyanates from other side,
conduct of temperature control during reaction and opening mold at the end of reaction and removing final product.

To achieve above mentioned purposes, the invention is a polyurethane foam synthesized by use of said method and comprises
32-34% MDI isocyanates,
50-52% polyether triol,
1-3% cell opening agent,
0.2-0.8% glycerine,
5-7% mono ethylene glycol,
0.3-1% gelling catalyst,
0.1-0.4% blowing catalyst,
0.4-0.8% silicon surfactant,
5-8% n-pentane.

The structural and characteristics features, and all advantages of the invention will be understood better with detailed descriptions given below. Therefore, the assessment should be made considering the detailed description.

DETAILED DESCRIPTION OF THE INVENTION

In this detailed description, a polyurethane foam composition and a method for synthesis thereof being subject of this invention and the preferred applications have been disclosed for the purpose of better understanding of the subject and described in a manner not causing any restrictive effect.

Invention is a method for polyurethane foam compositions convenient for use in automotive sector where rigidity and lightness are required and comprises process steps of
  i. conduct of polyol dosage adjustment,
  ii. adding a blowing catalyst onto polyol of convenient amount and mixing at mechanical mixture,
  iii. adding glycerine while mixing is continued,
  iv. adding surfactant while mixing is continued,
  v. adding a gelling catalyst while mixing is continued,
  vi. adding cell opening agent while mixing is continued,
  vii. adding mono-ethylene glycol while mixing is continued,
  viii. adding at least a blowing agent selected from a group consisting of n-pentane, cyclo-pentane, $c_3h_8o_2$ gas and $c_2h_4o_2$ gas while mixing is continued,
  ix. conduct of temperature adjustment of polyol base mixture,
  x. conduct of isocyanate dosage adjustment in a separate place,
  xi. injecting polyol base mixture into reaction container from one side and isocyanates from other side,
  xii. conduct of temperature control during reaction and opening mold at the end of reaction and removing final product.

In a preferred application of the invention, blowing catalyst mentioned in process step numbered (ii) is selected among tertiary amines. According to the most preferred application, amine cataylst comprising 30% dipropyleneglycol by weight is preferred as a blowing catalyst. In an application, said catalyst is a third amine with commercial title TEGOAMINE™ BDE (i.e. a solution of 70% bis(2-dimethylaminoether in 30% dipropylene glycol).

Glycerine added into mixture at step (iii) functions as a cross-linking agent and helps providing dimensional stability of final product. In addition, it has an essential role in adjustment of end product rigidity and elasticity.

In a preferred application of the invention, the surfactant in process step (iv) is silicone. More preferably, a silicone surfactant of 1.075±0.01 cm3 density at room temperature, viscosity 700±150 mPas, 7.4±1.2 pH is preferred. Homogenous and small cell structure is formed to provide final product with high shrinking resistance. In this application, commercial name of said surfactant is TEGOSTAB B 8905™ (e.g. a polyether-modified silicone).

In a preferred application of the invention, a gelling catalyst mentioned in process step numbered (v) is selected among tertiary amines. According to a preferred application, a catalyst comprising 33% triethylene diamine in dipropylene glycol by weight is preferred as the gelling catalyst. In an application, said catalyser is a third tertiary amine with commercial title TEGOAMINE 33™) (e.g. a solution of 33% triethylene diamine in 67% dipropylene glycol).

Cell opening agent added to mixture in process step (vi) enables open cell structure required for sound insulation of end product. In a preferred application of the invention, as cell opening agent polyols with KOH number (mg KOH/g polyol) between 30-35 is used. In an application polyether polyol of commercial title CORANOL CP 1421 (e.g. a high ethylene oxide content polyether triol) is used.

Mono-ethylene glycol added into mixture at step (vii) functions as cross-linking and helps providing dimensional stability of final product.

Blowing agents in process step (viii) not only enable the blowing reaction but also provides skin formation in the end product. In a preferred application of the invention, a blowing agent in process step (viii) n-penthane is used. In said step said adding process is made by help of a pump in close system in order to prevent evaporation of gas. Mixing rate is also essential for keeping gas in the system. In the said step said mixing process continues preferably 15-30 minutes at 400-600 rpm. According to the most preferred application, mixing process continues 20 minutes at 500 rpm.

In a preferred application of the invention, after process step (ix), temperature of polyol base mixture obtained after adding the blowing agent lastly is kept at 22-28° C. by help of a thermocouple. This value is preferably 25° C.

In a preferred application of the invention, in process step (xi) polyol base mixture is injected at 140-180 Pa pressure and isocyanates are injected at 130-170 Pa pressure. The values are preferably 160 Pa for polyol base mixture while 150 Pa for isocyanates. Here another important point is the temperature of reaction container. Temperature of the reaction container of the invention is preferably 42-48° C. and the most preferred one is 45° C.

Temperature of reaction mold in process step (xii) is at range of 42-48° C. Here temperature value is critical in respect to reaching skin thickness of end product. For completion of reaction, it waits for 3 to 7 minutes and at the end of reaction it takes shape of mold, and polyurethane foam is removed from mold.

Execution of the steps applied in the method of the invention in this order and with such parameters is critical. Particularly, by help of synergy developed by parameters such as selection of blowing agent, speed of mixing it with polyol base mixture, mixing temperature and reaction mold temperature, end product has desired rigidity, lightness and dimensional stability while also long use life of product is achieved, and also a skin with high mechanical strength is achieved.

The invention is also a polyurethane foam synthesized with said method. In an application of the invention, said polyurethane foam comprises by weight;
  32-34% MDI isocyanates,
  50-52% polyether triol,
  1-3% cell opening agent,
  0.2-0.8% glycerine,
  5-7% monoethylene glycol,
  0.3-1% gelling catalyst,
  0.1-0.4% blowing catalyst,
  0.4-0.8% silicone surfactant,
  5-8% n-pentane.

In an application of the invention, said polyurethane foam comprises by weight;
  33.8% MDI isocyanates,
  50.6% polyether triol,
  2.2% cell opening agent,
  0.7% glycerine,
  5.4% monoethylene glycol,
  0.4% gelling reaction catalyst, 0.2% blowing catalyst,
0.7% silicone surfactant,
6% n-pentane.

In above applications of the invention said gelling catalyst and the blowing catalyst is in a tertiary amine structure. According to the most preferred application, an amine catalyst comprising 30% dipropilenglycol by weight is preferred as the blowing catalyst. According to a preferred application, a catalyst comprising 33% triethylene diamine in dipropylene glycol by weight is preferred as the gelling catalyst.

In a preferred application of the invention, as said cell opening agent polyols with KOH number (mg KOH/g polyol) between 30-35 is selected.

Polyurethane foam of the invention is achieved as an end product of open cell structure displaying 130-300 gr/dm3 density, skin thickness of 1-2.5 mm, maximum 5% water absorption. Open cell structure and thick skin structure provides high acoustic performance.

Another importance of the invention is that method of the invention and polyurethane foam synthesized by the method has minimized ecological damage in comparison to its alternatives at present. By help of method of the invention it is possible to produce a polyurethane foam at low cost, not comprising halogen and conforming to global heating regulations.

The invention claimed is:

1. A method for forming a polyurethane foam product for use in an automobile, the method comprising the steps of:
    mixing polyether triol with a second polyol;
    adding a tertiary amine as a blowing catalyst to the mixture of polyether triol and second polyol;
    mechanically mixing the mixture of polyether triol, the tertiary amine, and the second polyol;
    adding a glycerin during the mechanical mixing;
    adding a silicone as a surfactant during the mechanical mixing;
    adding a gelling catalyst during the mechanical mixing;
    adding a blowing agent during the mechanical mixing;
    adding a cell opening agent during the mechanical mixing, the cell opening agent comprising a third polyol having a hydroxyl number (KOH) between 30 milligrams and 35 milligrams of potassium hydroxide per gram of the third polyol;
    adding monoethylene glycol during the mechanical mixing, wherein the blowing agent is selected from the group consisting of n-pentane, cyclopentane, $C_3H_8O_2$ gas and $C_2H_4O_2$ gas and mixtures thereof, wherein the mechanical mixing of all of the above ingredients forms a polyol base mixture;
    adjusting a temperature of the polyol base mixture;
    injecting the polyol base mixture into one side of a mold and an isocyanate into an opposite side of the mold;
    reacting the polyol base mixture and the isocyanate in a mold via controlling a temperature of the mold;
    opening the mold following the reacting; and
    removing the polyurethane foam product from the opened mold.

2. The method of claim 1, wherein the gelling catalyst is a tertiary amine.

3. The method of claim 1, wherein the blowing agent is a n-pentane.

4. The method of claim 1, wherein the step of adding the blowing agent comprises:
    pumping the blowing agent with a pump.

5. The method of claim 1, wherein the step of mechanically mixing is carried out for 15 minutes to 30 minutes at a mixing rate of 400 rpms to 600 rpms.

6. The method of claim 1, wherein the step of adjusting the temperature comprises:
    keeping the temperature to between 22° C. and 28° C. with a thermocouple.

7. The method of claim 1, wherein the step of injecting comprises:
    injecting the polyol base mixture at a pressure of between 140 Pa and 180 Pa; and
    injecting the isocyanate at a pressure of between 130 Pa and 170 Pa.

8. The method of claim 1, wherein controlling the temperature of the mold comprises controlling the temperature to be between 42° C. and 48° C.

9. The method of claim 1, wherein the isocyanate is methylene diphenyl diisocyanate, and the polyurethane foam product comprises the reaction product of:
    32% to 34% by weight of the methylene diphenyl diisocyanate;
    50% to 52% by weight of the polyether triol;
    1% to 3% by weight of the cell opening agent;
    0.2% to 0.8% by weight of glycerin;
    5% to 7% by weight of the monoethylene glycol;
    0.3% to 1% by weight of the gelling catalyst;
    0.1% to 0.4% by weight of the tertiary amine blowing catalyst;
    0.4% to 0.8% by weight of the silicone surfactant; and
    5% to 8% by weight of the n-pentane, wherein a total of the methylene diisocyanate, the polyether triol, the cell opening agent, the glycerin, the monoethylene glycol, the gelling catalyst, the tertiary amine blowing catalyst, the silicone surfactant, and the n-pentane does not exceed 100% by weight of the components reacted to form the polyurethane foam product.

10. The method of claim 9, wherein the tertiary amine blowing catalyst has 30% by weight of dipropylene glycol.

11. The method of claim 9, wherein the gelling catalyst has 33% by weight of triethylene diamine.

* * * * *